July 12, 1966   TADASHI ASANO ETAL   3,260,514
VERTICAL KILN AND A METHOD FOR THE PREPARATION
OF CALCINED PRODUCTS
Filed Feb. 28, 1964   4 Sheets-Sheet 2
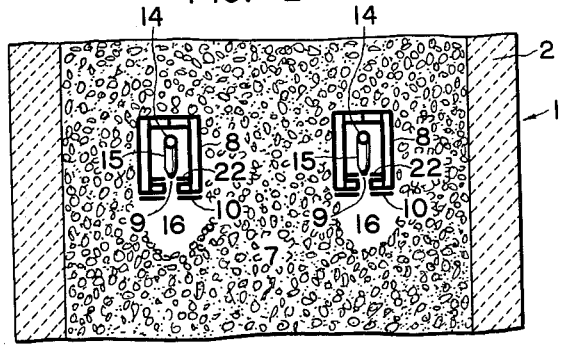
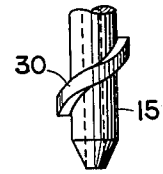
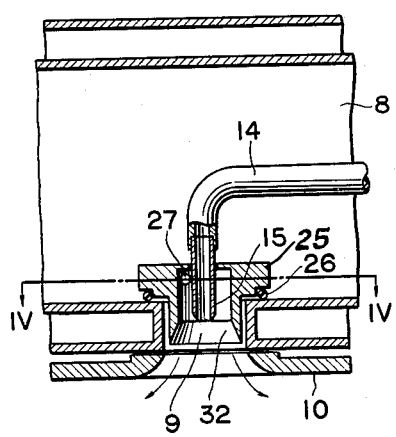
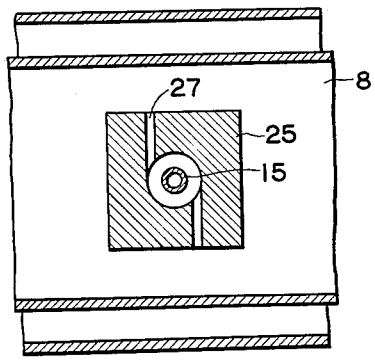

United States Patent Office 3,260,514
Patented July 12, 1966

1

3,260,514
VERTICAL KILN AND A METHOD FOR THE PREPARATION OF CALCINED PRODUCTS
Tadashi Asano, Senichi Masuda, and Tsutomu Ito, Tokyo, Japan, assignors to Onoda Cement Company, Limited, Onoda, Japan
Filed Feb. 28, 1964, Ser. No. 348,168
Claims priority, application Japan, Mar. 6, 1963, 38/10,333; June 11, 1963, 38/29,904; Sept. 16, 1963, 38/49,789
6 Claims. (Cl. 263—30)

This invention relates to a vertical kiln and a method for the preparation of calcined products by calcining such a raw material as limestone, dolomite, clay, cement raw mixture or the like by using such a fluid fuel as crude petroleum, petroleum distillate or petroleum heavy oil.

The present practice of calcining limestone by using a liquid fuel is generally accomplished in such vertical kilns and by such methods as described hereinafter.

(A) A feed material is calcined in a vertical kiln which is provided with a plurality of combustion chambers around its outside. The fuel is injected into the combustion chambers, and subjected to combustion to produce a hot gas comprising the remaining part of the fuel. The remaining fuel is subjected to second combustion by the pre-heated air ascending from the lower part of the kiln. The feed material is calcined by the hot gas and the second combustion gas.

(B) A feed material is calcined in a vertical kiln which is provided with a plurality of combustion chambers around its inside. The combustible fluid fuel is injected into the combustion chambers from the plurality of nozzles.

(C) A feed material is calcined in a vertical kiln which is provided with a plurality of outside and inside combustion chambers in the same manner as in A and B mentioned above.

(D) A feed material is calcined in a vertical kiln by blowing the combustible gasified fuel from a plurality of nozzles located at the side wall or the center part of the kiln. In such a case, the liquid fuel is gasified in the gasifying chamber located separate from the vertical kiln.

(E) A feed material is calcined in a vertical kiln by using a hot gas produced in the first and the second combustion zone of the fluid fuel wherein a combustible mixture of fluid fuel and primary air is introduced and distributed throughout the entire cross section of the calcination zone in the kiln using water-cooled beams as vertical conduits which are spaced between each other to distribute the fuel mixture as described in the Japanese patent publication No. 10017/60 and U.S. Patent No. 2,933,297.

Experiments were heretofore made in accordance with Items A, B and C, but the results were generally unsatisfactory because of difficulty of continuing a long run of operation due to hindrance provided by the accumulation of free carbons and tarry substances deposited in the combustion chambers of the kiln. In such a case, the gasification and combustion of the liquid fuel are incomplete. Although such hindrance may be overcome by introducing a turning gas current into the combustion chambers, still it has such disadvantages as follows:

(1) The cost of equipment is necessarily increased.
(2) The cost of operating and controlling the device for producing an atomizing medium such as a high pressure air or steam to atomize the liquid fuel is expensive.
(3) The atomizer is occasionally clogged with free carbons and tarry substances.
(4) The feed material to be calcined is overheated at near the nozzles in the kiln due to the accumulation of heat while in other sections of the kiln the material is only partially burnt.
(5) The output of the kiln is restricted due to difficulty in charging the hot gas derived from the combustion chamber into the center part of the kiln.

Item D also has the same disadvantages as those of A, B and C. In addition, this D method necessarily requires equipment complicated in construction as well as having the disadvantage that the heat efficiency is decreased due to the cooling of the hot gas produced in the separate gasifying chamber before it is charged into the kiln.

As for the method of E, it is fairly effective in the case of using gaseous fuel, but it also has such disadvantages as follows in the case of using liquid fuel.

(1) There are difficulties in distributing the liquid fuel having high viscosity into a plurality of nozzles and blowing the liquid fuel from the nozzles into the kiln, and in this method the nozzles tend to be clogged with free carbons and tarry substances.

(2) The liquid fuel must be atomized after it was charged into a plurality of nozzles in order to effect its first combustion around the outlets of nozzles. But low grade fuel such as petroleum heavy oil can not be easily atomized in the case of using the water-cooled beams as described in the Japanese patent publication No. 10017/60 and U.S. Patent No. 2,933,297. In such a case, the burner must be manufactured intricately but the intricate burner is of little practical use because its operation is so complicated.

(3) The lip-like piece located on the upper part of the burner must be considerably enlarged in order to effect the first combustion of the low grade fuel such as petroleum heavy oil having a low combustion rate. This is not desirable in considering the durability of the water-cooled beams and the transfer of limestone.

The inventors have developed this invention in order to overcome the disadvantage adherent to the prior art.

An object of this invention is to provide an improved vertical kiln suitable for use in the preparation of high grade and uniform calcined products by calcining raw materials with the fluid fuel.

Another object of this invention is to provide an economical method for the preparation of high grade and uniform calcined products by calcining raw materials with liquid fuel.

Other objects of this invention will be obvious from the detailed explanation hereinafter.

For a better understanding of this invention reference may be had to the accompanying drawings, in which:

FIGURE 2 is an enlarged sectional view of the nozzle casing taken along line II—II in FIGURE 1;

FIGURE 3 is a sectional elevational view of the device for blowing a gas in the film state;

FIGURE 4 is a sectional view taken along line IV—IV in FIGURE 3;

FIGURE 7 is a perspective of the nozzle in FIGURE 5;

Figure 1:
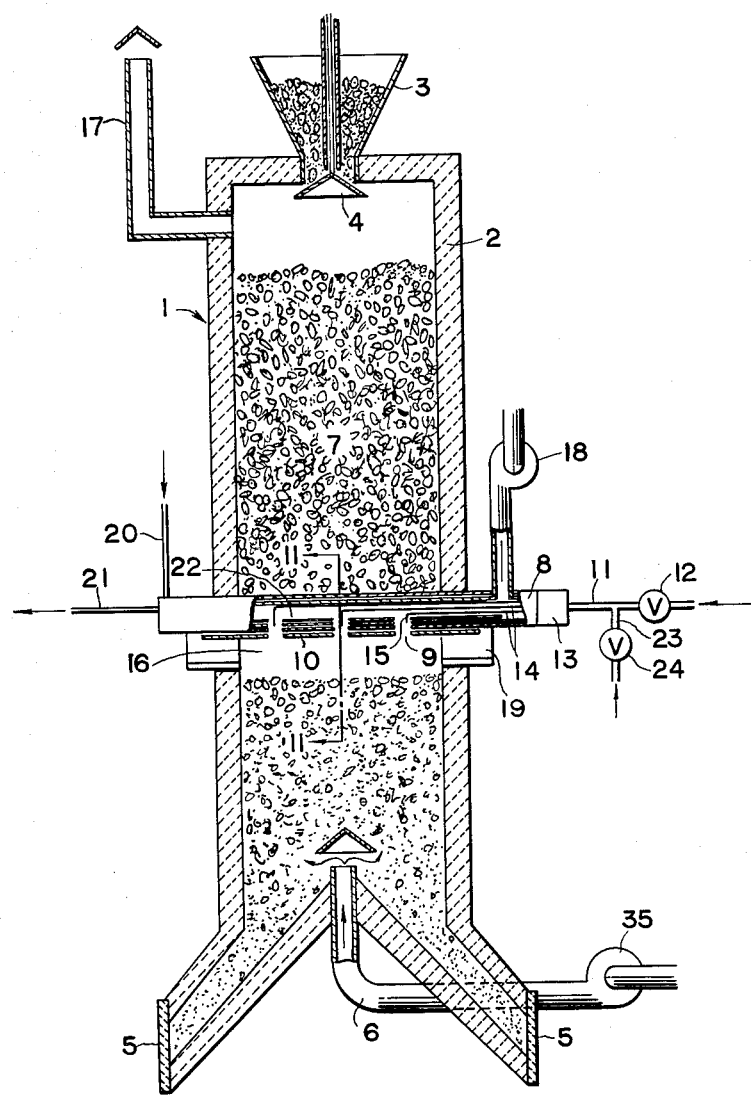
FIGURE 1 is a sectional elevational view of the vertical kiln illustrating the principles and features of this invention.

Shown in FIGURE 1 is a vertical kiln embodying the principles of this invention and comprising the vertical shaft 1 of a rectangular or circular cross section provided with the refractory lining 2 therefor and having the hopper 3 provided with the charging device 4 at the top of the kiln for introduction of the raw material to be calcined continuously or intermittently. The calcined product is removed from the discharge device 5 provided at the bottom of the kiln continuously or intermittently. Air is supplied from the blowing pipe 6 and the blower 35 into the kiln and passed upwardly through the packed layer 7 while the air is preheated with the sensible heat of the hot calcined product descending in the kiln. Numeral 8 represents the water-cooled nozzle casing extending horizontally across the packed layer, and it is supported at the opposite ends by the end walls 2 and 2. The water-cooled nozzle casing is shown in two in FIGURE 2 but it should be understood that either only one water-cooled nozzle casing or a plurality of water-cooled nozzle casings placed in horizontally or in vertically may be used depending on the capacity of the kiln and the calcination conditions of the raw material. Also, it should be understood that the water-cooled nozzle casing is not limited to one having a rectangular cross section as shown in FIGURE 2 but that it is made to have the upper surface having a larger convex curvature than the rest angle of the raw material to be charged in order to facilitate the descending of the raw material and also reduce the load on the upper surface of said nozzle casing, and further that said nozzle casing is made to have the under surface having a larger concave curvature than the rest angle of the raw material to be charged in order to increase the load upwardly pushed against the under surface of said nozzle casings. The water-cooled nozzle casing may be made of steel or other heat-resistance metals and constructed in double walls, and hence the cooling water is charged into the space between the outside wall and the inside wall.

The water-cooled nozzle casing 8 provided with a plurality of nozzle ports 9 arranged on the under surface thereof transversely, and also provided with the heat-resistant plate 10 which is the same as the said nozzle casing 8 in size. The heat-resistant plate 10 is provided with the same size hole as that of the nozzle port 9 on the same level and is placed in parallel to the said nozzle casing and there is a space of several millimeters between said heat-resistant plate and the under surface of said nozzle casing. In accordance with the invention, it is preferable to provide the heat-resistant plate 10 so that it prevents the temperature increase of the under surface of said nozzle casing and also the deposition of soot and tarry substance on the under surface of said nozzle casing.

The liquid fuel is charged at a give rate from the fuel-pipe 11 into a plurality of oil-pipes 14 provided in the nozzle casing 8 through the fluid fuel distributor 13 provided on the outside of the vertical kiln by opening the valve 12 and then the fluid fuel is charged from the nozzle 15 located at the end of the oil-pipe 14 into the air cave 16 having a U-shaped cross section, which is formed directly under the nozzle casing 8, through the nozzle port 9 and the hole of the heat-resistant plate 10. The liquid fuel thus charged is distributed into the packed layer 7 and mostly evaporated and gasified during descending by the heat of the calcined product and the upward flow of the preheated air and then the gasified fuel is burnt in the lateral and the upper part of the nozzle casing 8 to form a calcination zone. The calcination zone is maintained at a calcination temperature of the raw material, for example, at a temperature of from 950° to 1300° C. in the case of calcining limestone or at a temperature of from 1250° to 2000° C. in the case of calcining cement raw mixture, which is varied depending on the natures of raw materials to be calcined. In accordance with this invention, it is most important to control the amount of the liquid fuel to be charged into the vertical kiln from the nozzle 15 of the oil-pipe 14 and to maintain it at a constant flow in each nozzle. In order to meet these requirements, the fuel-pipe 11 may be changed into a distributing device by dividing the same into a plurality of small pipes having members corresponding to the oil-pipe 14. The diameter of said small pipe is designed so that said pipe has higher resistance against the liquid fuel than the resistance of the oil-pipe 14 and keeps the liquid fuel to flow through said small pipes at the same temperature. Such a distributing device may be provided in the water-cooled nozzle casing in the ratio of at least one to one water-cooled nozzle casing. Thus, the calcining zone is formed in a given area in the kiln and the temperature distribution in the kiln does not vary in the vertical section of the kiln and the yield of the calcined product is greatly increased by using the kiln.

The soot and tarry substances formed as by-product when the liquid fuel is evaporated and gasified are burnt off by descending in the kiln together with the calcined product and contacting the preheated air flowing upward. The burnt gas is expelled from a stack at the top of the kiln while the charging material is heated in a preheated zone and a storing zone by contacting the burnt gas flowing upward in the kiln. If desired, the exhaust gas expelled from the stack or a mixture the exhaust gas and air or oxygen can be cycled into the kiln through the fan 18 and the nozzle casing 8 and then used for preventing the deposition of soot and tarry substances on and around the nozzle port 9. The eye-hole 19 is provided with on the wall of the kiln at the position corresponding to the position of the air cave 16 for observing the status in the kiln. Numeral 20 represents an inlet for the cooling water and 21 represents an outlet of the exhaust water. The nozzle shutter 22 is made of a heat-resistant material and is inserted in the lower part of the inside of the nozzle casing 8. The nozzle shutter can be removed to the direction along the length of the nozzle casing 8 and is provided with a hole similar to the hole of the nozzle port 9 and is situated at the position corresponding to the position of the nozzle port 9. When the charge of the liquid fuel must be stopped during operation, the valve 12 of the fuel-pipe 11 is closed and the valve 24 of the air pipe 23 is opened and then the liquid fuel of the oil pipe 14 is blown out into the kiln by the air pressure and then the nozzle shutter 22 is removed to the direction along the length of the nozzle casing 8. Thus, the nozzle 15 of the oil pipe 14 is shut out from the air cave 16 and therefore the nozzle 15 can be kept free from the deposition of carbons.

In accordance with this invention, the vertical kiln as shown in FIGURE 1 can be modified by using a device for blowing a gas in the film state through the nozzle port 9 from the nozzle casing 8. The device designed for this purpose is inserted into the nozzle port 9, into which is charged an oxydizing gas such as oxygen or air or an inert gas such as a flue gas derived from the kiln, nitrogen or carbon oxide or a mixture thereof to form a gas film on and around the nozzle casing 8 and the nozzle port 9.

Referring to FIGURES 3 and 4, the device 25 for blowing a gas in the film state is provided with the lidded hollow cylindrical port 32 open at the bottom and having a gas inlet hole 27 placed at the center part of the lid. The nozzle 15 of the oil-pipe 14 is inserted in the hole 26. The contact surface between the nozzle casing 8 and the device 25 is tightly fitted with O-ring 26 for preventing a gas leakage. One end of the hole 27 opens into a gap between the lidded cylindrical port 32 and the nozzle 15 and the gas may be injected in the tangential direction to the surface of said nozzle 15. Said hole 27 is connected to the nozzle casing 8 and may be used only in one but it is preferable to use it in two or more. If the nozzle is connected to the oil-pipe 14 by means of screw, the nozzle 15 can easily be replaced with the new nozzle 15.

Figure 5:
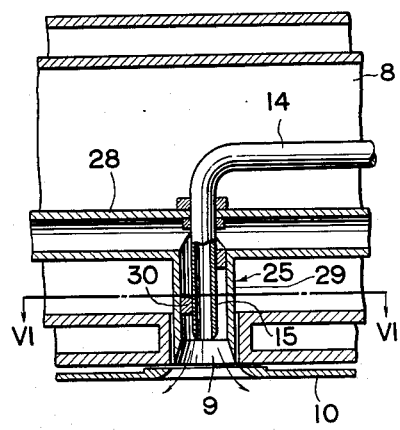
FIGURE 5 is a sectional elevational view of another device for blowing a gas in the film state.

Referring to FIGURES 5 and 7, the device 25 for blowing a gas in the film state is a pipe-like form. The pipe 29 branches from the gas-inlet pipe 28 and is inserted into the nozzle port 9 of the nozzle casing 8, together with the oil pipe 14. The nozzle 15 is provided with the spiral blade 30 and inserted into the pipe 29. In using this device, the combustible gas, soot and tarry substances in the kiln may occasionally enter into the nozzle casing 8 through a gap between the nozzle port 9 and the device 25 as a back-flow. Such a back-flow can be prevented by feeding the gas into the nozzle casing 8 or by using a heat-resistant O-ring on the outside surface of the device 25.

Figure 8:
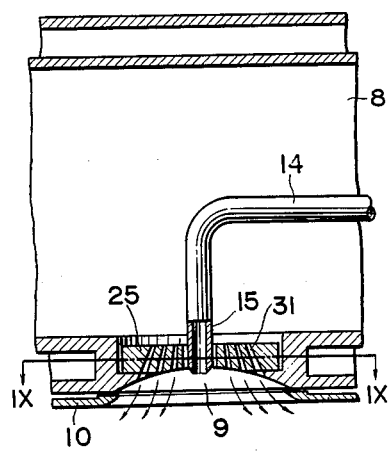
FIGURE 8 is a sectional elevational view of another device for blowing a gas in the film state.
Figure 6:
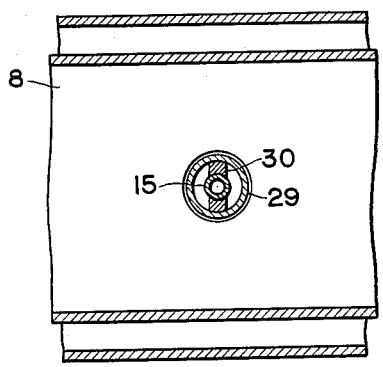
FIGURE 6 is a sectional view taken along line VI—VI in FIGURE 5.
Figure 9:
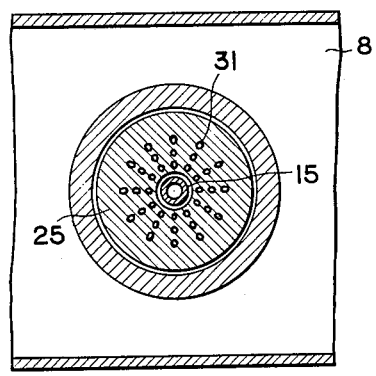
FIGURE 9 is a sectional view taken along line IX—IX in FIGURE 8.

Referring to FIGURES 8 and 9, the device 25 for blowing a gas in the film state is formed plate-like and inserted into the nozzle port 9. The device is provided with the hole at the center part of the device and a plurality of holes 31 on the surface of the device. The nozzle 15 can be inserted into the hole 26, and the hole 31 is designed to distribute a gas radially.

Figure 10:
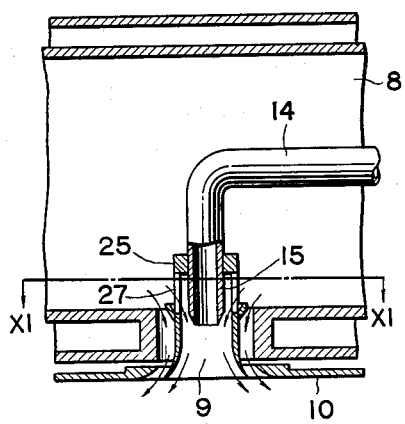
FIGURE 10 is a sectional elevational view of another device for blowing a gas in the film state.
Figure 11:
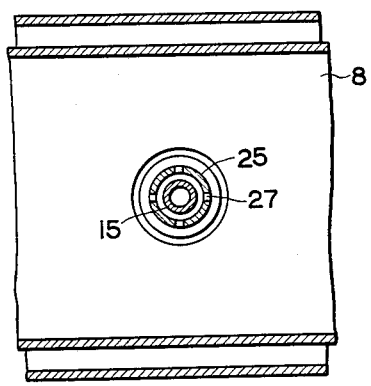
FIGURE 11 is a sectional view taken along line XI—XI in FIGURE 10.

Referring to FIGURES 10 and 11, the device 25 for blowing a gas in the film state is formed in trumpet type and inserted into the nozzle port of the nozzle casing 8. The device is provided with the gas-inlet hole 27 at the upper part and the nozzle 15 is inserted into the center port. When a gas containing soot and tarry substances is adhered to the end of the nozzle 15 or introduced into the device to cause deposition of soot and tarry substances on and around the nozzle port due to the deviation of the inner pressure of the kiln or erroneous control of the amount of the gas flow, such a hindrance can be avoided by using the device as shown in FIGURES 12 and 13.

Figure 12:
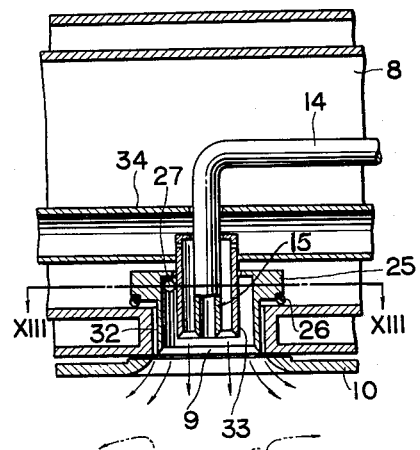
FIGURE 12 is a sectional elevational view of another device for blowing a gas in the film state.
Figure 13:
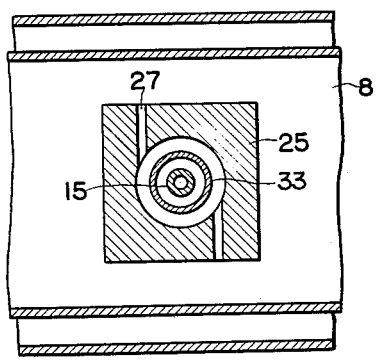
FIGURE 13 is a sectional view taken along line XIII—XIII in FIGURE 12.

Referring to FIGURES 12 and 13, the device 25 is a combination of the devices of FIGURES 3 and 10. The device 25 is formed in hollow type provided with the lidded cylindrical part 32 opened at the bottom and it is inserted into the nozzle port 9. Said device 25 is provided with the hollow cylindrical gas inlet 33 at the center part of the lid, and the gas inlet hole 27. One end of said hole 26 is opened into a gap between the lidded cylindrical part 32 and the hollow cylindrical gas inlet 33. The other end is opened into the nozzle casing 8. The hollow cylindrical gas inlet 33 is provided with one or more gas inlet hole 26 so that the gas may be injected in tangential direction to the surface of said gas inlet 33. The nozzle 15 is inserted into said gas inlet 33 at the center part. A heat-resistant O-ring is placed on the contact surface between a device 25 and the nozzle casing 8 to prevent the gas leakage into the kiln. Gas is charged into the nozzle casing 8 and a part of the gas is injected from a gap between the nozzle 15 and the hollow cylindrical gas inlet 33 into the kiln in the state of straight flow encircling around the fluid fuel charged. The remaining part of the gas is injected into the kiln in the state of turning flow encircling around the straight flow thereby to form a gas film around the nozzle port 9.

The solid straight arrows and curved arrows as shown in FIGURE 12 indicate respectively the directions of the straight flow and the turning flow of the gas respectively. The ratio of the amount of straight to turning flow must be controlled so that the gasified fluid fuel does not reach near the nozzle 15 and therefore the gas film is formed in the state as shown by the dotted arrows. In order to control the gas amount in such a manner, the gap between the nozzle 15 and the hollow cylindrical gas inlet 33 or the size of the gas inlet hole 26 may be controlled. Further, the gas pipe 34 which is connected to said gas inlet 33 is inserted into the nozzle casing thereby to separate the straight flow from the turning flow and the ratio of the amount of the straight to turning flow may be separately controlled by the means of valve. The flow velocity of the straight flow at the outlet of the device 25 may be controlled to 0.4~8 meter per second. At such a flow velocity, the first combustion of the liquid fuel does not occur near the outlet of the nozzle even when air is used as a straight flow gas. When an inert gas is used as a straight flow gas and an oxidizing gas is used as a turning flow gas, the temperature of the U-shaped air cave is decreased and hence, the fluid fuel does not adhere to the nozzle, so that the kiln can be operated in a long run.

As mentioned above, this invention has such advantages as that the feed material can uniformly be calcined to produce a homogeneous calcined product by reducing the consumption of the liquid fuel, resulting in an increase in the output.

What we claim is:

1. A vertical kiln for calcining a material, said kiln comprising a vertical shaft having laterally spaced walls, a casing extending laterally between said walls, means to cool said casing with a liquid coolant, conduits for liquid fuel, said conduits extending into said casing, outlet nozzles on said conduits, said nozzles being directed downwards relative to said vertical shaft, said vertical shaft including a feed zone for said material in the upper portion, a calcining zone below said feed zone but above said casing, means to define an air cave directly under said casing and a cooling zone for said material in the lower portion below said air cave, said casing including outlet ports for said nozzles, and means positioned in said ports and surrounding said nozzles for blowing a gas into said air cave to form a laterally extending film of gas in said air cave.

2. The vertical kiln of claim 1, further including a laterally extending heat resistant plate, said plate being juxtaposed to the bottom of said casing and substantially parallel thereto and laterally coextensive therewith, said heat resistant plate including port means substantially coincident with the ports of the nozzle casing.

3. A method for calcining a material comprising providing a laterally extending calcining zone, feeding the raw material to be calcined downwards toward and through said calcining zone, calcining said material as it is fed through said calcining zone, providing a second laterally extending zone below and in juxtaposition to said calcining zone, cooling said second zone with a cooling liquid, providing an air cave below and in juxtaposition to said second zone, moving the calcined material downward around and below said second zone and said air cave, feeding a liquid fuel downwards into said air cave from a liquid fuel source comprising points located in a lower portion of said second zone, distributing said liquid fuel from said air cave into said calcined material below said air cave, feeding gas from a first gas source comprising points in said second zone and distributing said gas to form a layer of the gas beneath said second zone in juxtaposition to said first gas source, feeding a gas upwards through the calcined material from a second gas source comprising a point below said air cave whereby said gas from said second gas source is heated by sensible heat from said calcined material, the calcined material is correspondingly cooled, and the heated gas from the second gas source evaporates the liquid fuel distributed in the calcined material and transports the evaporated fuel to the air cave and said second zone, and burning the evaporated fuel in an upper laterally extending portion of said second zone to provide heat to the calcining zone for the calcining.

4. The method of claim 3, further comprising insulating the bottom of said second zone from the burning of the evaporated fuel by providing an insulating zone between the bottom of said second zone and said air cave.

5. The method of claim 3, further comprising cycling into the air cave exhaust gases resulting from the burning of the evaporated fuel, said cycled gas comprising said gas from said first source.

6. The method of claim 5, further comprising insulating the bottom of said second zone from the burning of the evaporated fuel by providing an insulating zone between the bottom of said second zone and said air cave.

References Cited by the Examiner

UNITED STATES PATENTS

| 2,464,304 | 3/1949 | Gottlieb | 263—29 |
| 2,933,297 | 4/1960 | Erasmus et al. | 263—30 |

FOREIGN PATENTS

| 1,111,090 | 7/1961 | Germany. |

FREDERICK L. MATTESON, Jr., *Primary Examiner.*

WILLIAM F. O'DEA, *Examiner.*

D. A. TAMBURRO, *Assistant Examiner.*